United States Patent [19]
Katagiri et al.

[11] Patent Number: 5,785,176
[45] Date of Patent: Jul. 28, 1998

[54] CASSETTE ACCOMMODATING CASE

[75] Inventors: Shingo Katagiri; Teruo Ashikawa. both of Kanagawa, Japan

[73] Assignee: Fuji Photo Film Co., Ltd., Kanagawa, Japan

[21] Appl. No.: 730,758

[22] Filed: Oct. 15, 1996

Related U.S. Application Data

[62] Division of Ser. No. 365,551, Dec. 28, 1994, Pat. No. 5,586,654.

[30] Foreign Application Priority Data

Dec. 28, 1993 [JP] Japan ............... U.M.HEI5-74515
Dec. 28, 1993 [JP] Japan ............... U.M.HEI5-74516
Sep. 29, 1994 [JP] Japan ............... P.HEI.6-235405

[51] Int. Cl.⁶ ............................................. B65D 85/672
[52] U.S. Cl. ...................... 206/387.1; 206/1.5; 206/493
[58] Field of Search .......................... 206/387.1, 387.13, 206/493, 1.5

[56] References Cited

U.S. PATENT DOCUMENTS

| | | | |
|---|---|---|---|
| 3,620,361 | 11/1971 | Fugiwara . | |
| 4,102,452 | 7/1978 | Sato et al. . | |
| 4,184,594 | 1/1980 | Hehn . | |
| 4,673,083 | 6/1987 | Schuett . | |
| 4,753,347 | 6/1988 | Bellante et al. . | |
| 4,913,287 | 4/1990 | Kagano | 206/387.1 |
| 4,962,854 | 10/1990 | Ricci | 206/387.1 |
| 5,186,325 | 2/1993 | Sato et al. | 206/387.1 |
| 5,429,237 | 7/1995 | Morita | 206/387.1 |
| 5,445,268 | 8/1995 | Suzuki | 206/387.1 |
| 5,518,116 | 5/1996 | Morita | 206/387.1 |

FOREIGN PATENT DOCUMENTS

| | | |
|---|---|---|
| A1 0229419 | 7/1987 | European Pat. Off. . |
| A2 0494690 | 7/1992 | European Pat. Off. . |
| A2 0523720 | 1/1993 | European Pat. Off. . |
| 2555734 | 6/1977 | Germany . |
| A1 3414070 | 11/1984 | Germany . |
| 353007315 | 1/1978 | Japan . |
| 537315 | 1/1978 | Japan . |
| 404311484 | 11/1992 | Japan . |
| 4311484 | 11/1992 | Japan . |
| A 2092109 | 8/1982 | United Kingdom . |
| A 2162826 | 2/1986 | United Kingdom . |

*Primary Examiner*—Paul T. Sewell
*Assistant Examiner*—Nhan T. Lam
*Attorney, Agent, or Firm*—Sughrue, Mion, Zinn, Macpeak & Seas, PLLC

[57] ABSTRACT

A cassette accommodating case in which a tape cassette can be inserted in either a forward or backward orientation, and for preventing slackening of a magnetic tape, and to secure the tape cassette to eliminate play. Positioning projections having inclined surfaces are provided on each side of a casing section. When the casing section and a cover section are closed, the inclined surfaces abut against the ends of side projections on side surfaces of the tape cassette to push the tape cassette when the casing and cover sections are closed. A rotation-preventing projection of an accommodating case protrudes into a common area of the hubs when a cassette is loaded in the forward and backward orientations, and the projection includes two plate-like portions of different heights, disposed in parallel, and with a predetermined interval therebetween. A distal end of the long plate-like portion has a guiding inclined surface for correcting the positional offset of the hub by contacting its inner peripheral surface. The hub is retained by the two plate-like portions. Backward-pressing surfaces are provided in opposing corner portions of the case to secure the cassette tape within the case.

7 Claims, 14 Drawing Sheets

L1 > L2

1

CASSETTE ACCOMMODATING CASE

This is a divisional of application Ser. No. 08/365,551 filed Dec. 28, 1994 U.S. Pat. No. 5,586,654.

BACKGROUND OF THE INVENTION

1. Field of the Invention

The present invention relates to a cassette accommodating case for storing an audio magnetic tape cassette, and more particularly to a cassette accommodating case in which a magnetic tape cassette can be accommodated in either a forward or a backward orientation thereof.

2. Background Art

A magnetic tape cassette (hereafter simply referred to as a "tape cassette") which is conventionally used as an audio tape or the like has a front opening portion into which a magnetic head or the like is inserted when the tape cassette is loaded in a recording/reproducing apparatus or the like. The magnetic tape is wound in such a manner as to traverse the front opening portion. Accordingly, dust may enter the interior of the tape cassette through the front opening portion, and the dust may be adhered to the magnetic tape, causing poor magnetic recording and/or reproduction. Hence, the magnetic tape cassette is usually stored in a state in which it is accommodated in a cassette accommodating case (hereafter simply referred to as an "accommodating case") formed of plastic for the purpose of preventing the entrance of dust as well as protecting the magnetic tape exposed at the front opening portion and protecting the overall tape cassette.

FIG. 22 shows a conventional accommodating case. As a basic arrangement thereof, this accommodating case 1 is comprised of a cover section 11 and a casing section 12 rotatably connected thereto. The cover section 11 has a cover-side opposing wall 13 arranged to extend along one surface of a tape cassette 2 and a pocket 14 which is disposed on one side of the cover-side opposing wall 13 and into which a front opening portion 21 of the tape cassette 2 is inserted. As shown in the drawing, an index card 3 and the tape cassette 2 are capable of being inserted into and drawn out of the pocket 14 along the cover-side opposing wall 13.

The casing section 12 has a casing-side opposing wall 15 for covering the other surface of the tape cassette 2 loaded in the cover section 11, a pair of pivotally attaching portions 16 for rotatably connecting the casing-side opposing wall 15 to the cover section 11, and a pair of rotation-preventing projections 17 project from the casing-side opposing wall 15.

The pivotally attaching portions 16 are formed such that a pair of shaft-like projections, which are respectively fitted in shaft-receiving holes formed in both side walls of the pocket 14 of the cover section 11, are provided on corresponding inner side portions of the casing section 12, thereby connecting the cover section 11 and the casing section 12 in such a manner as to be rotatable with respect to each other. The rotation-preventing projections 17 prevent slackening of the magnetic tape during storage by engaging hubs 22 of the tape cassette 2 loaded in the cover section 11 when the casing-side opposing wall 15 is closed with respect to the cover section 11 when the latter is rotated about pivotally attaching portions 16.

Specifically, each rotation-preventing projection 17 is comprised of, for instance, a retaining piece 18 whose width is set such that opposite side portions thereof project between adjacent ones of hub pawls 23 which project from the inner periphery of the hub 22, as well as a pair of projections 19 provided perpendicular to the retaining piece 18 and whose opposite side portions face the opposing hub pawls 23, respectively.

The retaining pieces 18 and the projections 19 are shaped such that their upper end side is cut diagonally to facilitate fitting in the hub 22. The double-headed arrow (a) in FIG. 22 indicates the directions in which the casing section 11 is opened and closed, while arrow (b) indicates the direction in which the index card 3 and the tape cassette 2 are inserted into the cover section 11.

The entire tape cassette 2 can be accommodated in the accommodating case 1 if the cover section 11 is opened as shown in the drawing, the front opening portion 21 of the tape cassette 2 is accommodated in the pocket 14, and the cover section 11 and the casing section 12 are then closed together.

With the above-described arrangement, however, the direction in which the tape cassette 2 is inserted is limited to one direction, i.e., the direction in which the front opening portion 21 is accommodated in the pocket 14. Thus, the rotation-preventing projections 17 are designed so that the tape cassette 2 can be loaded into the pocket 14 from the front opening portion 21 side, which is herein referred to as "forward orientation", and if the tape cassette 2 is inserted erroneously in the opposite side with front opening portion 21 side, which is herein referred to as "backward orientation", the case cannot be closed, and the tape cassette 2 must be reinserted after correcting the orientation of the tape cassette 2 to the forward orientation.

Accordingly, arrangements shown in, for example, U.S. Pat. No. 5,168,998, Japanese Patent Application Laid-Open No. 4-11484, and European Patent 0 523 720A have been proposed as accommodating cases in which the tape cassette 2 can be accommodated in both the forward orientation and the backward orientation.

Such an accommodating case in which the tape cassette can be accommodated in either orientation has the following problem. Namely, the position where each hub 22 is formed is set such that a distance L1 from a front edge to a center axis of the hub and a distance L2 from a rear edge to the center axis are in a relation of L1>L2, as shown in FIG. 23. Accordingly, the position of the hub 22 is offset in a case where the tape cassette 2 is inserted in forward orientation as shown in FIG. 2 and in a case where it is inserted in backward orientation. To describe this relationship with reference to a schematic diagram of the hub shown in FIG. 22 and FIG. 24, if it is assumed that the position of the hub 22 in the case where the tape cassette 2 is inserted in either one of the orientations is the position indicated by the solid lines, then the position of the hub 22 in the case where the tape cassette 2 is inserted in the opposite orientation is offset as indicated by the phantom lines. Hence, an interval W (a common area 4) corresponding to the difference, L1−L2, is the only space available for inserting the pair of rotation-preventing projections. For this reason, to prevent the magnetic tape from slackening by making use of the interval W, the rotation-preventing projection in terms of its shape must be formed into the shape of a tongue which is relatively thin.

The essential function of the rotation-preventing projections is to prevent the slackening of the magnetic tape, but the rotation-preventing projections in some cases also serve to position the tape cassette as they abut against the hubs. Particularly in the case of the type in which the tape cassette can be accommodated in either orientation, since the interval W of the common area 4 is small, the rotation-preventing projections have a relatively thin structure, and this may be problematic if the hubs and the rotation-preventing projections strongly abut against each other when closing the accommodating case. In the closing operation, after the tape cassette is inserted into the pocket of the accommodating case, the rotation-preventing projections move the hubs when the rotation-preventing projections enter the hub holes. Since the positional accuracy of the rotation-preventing projections is poor, a situation can occur in which the rear edge of the cassette is caused to float from the innermost portion of the pocket by the engagement between the rotation-preventing projections and the hubs. This increases the risk of the rotation-preventing projections becoming broken or the hub pawls becoming damaged, thereby causing a decline in the reliability of the accommodating case.

In addition, not only in the accommodating case of the type in which the tape cassette can be accommodated in either orientation but also in the type such as the one shown in FIG. 22, it is not desirable in terms of the function of cassette protection for the tape cassette to move with "play" inside the accommodating case. However, there has been a problem in that if an attempt is made to position the cassette without play by reducing the dimensions for accommodation by the setting of ribs which are formed on inner surfaces of side walls of the accommodating case, the parts become caught when, for instance, the accommodating case is closed, thereby causing a decline in the operating efficiency.

As shown in FIG. 25, the thickness W1 of the retaining piece 18 in the rotation-preventing projection 17 is far smaller than the interval $W_0$ between adjacent ones of the hub pawls 23 of the hub 22. Because of this dimensional difference, even if the rotation-preventing projection 17 is engaged with the hub 22, the hub is capable of rotating in the range of $W_2=W_0-W_1$. Due to this rotation, slackening occurs in the tape exposed in the front opening portion 21, or it becomes difficult to restrict the movement of the hubs since opposite side ends of the projections 19 are offset from the positions where they oppose the hub pawls 23. Hence, there has been a problem in that an undesirable shock acts on the hubs or the tape due to movement or play of the tape during carrying or the like.

SUMMARY OF THE INVENTION

An object of the present invention is to provide an accommodating case which makes it possible to position the tape cassette accurately in the accommodating case, and which case can be efficiently opened and closed. Another object of the present invention is to provide a cassette accommodating case which makes it possible to insert the tape cassette in both the forward orientation and the backward orientation, which makes it possible to reliably prevent the slackening of the magnetic tape, and which makes it possible to avoid damage to hub pawls and the like by avoiding unnecessary abutment of the rotation-preventing projections and the hubs.

Another object of the present invention is to overcome the above-described problems and provide an accommodating case with improved handling efficiency, and which makes it possible to accurately position and fix the hubs of the tape cassette and prevent slackening of the tape due to the rotation of the hubs and an unexpected shock due to the movement or play of the hubs, thereby preventing damage to the hubs.

According to the present invention, there is provided a cassette accommodating case including a cover section, which has a cover-side opposing wall arranged to extend along one surface of a magnetic tape cassette and a pocket capable of accommodating one end of the magnetic tape cassette on a one end of the cover-side opposing wall, and a casing section which has a pair of rotation-preventing projections provided on a casing-side opposing wall facing the cover-side opposing wall to retain a pair of hubs of the magnetic tape cassette by entering the hubs, the casing section being pivotally attached to the cover section in such a manner as to be capable of being opened and closed, the cassette accommodating case characterized in that each of the rotation-preventing projections has two plate-like portions which are provided so as to extend in parallel with each other with a predetermined interval therebetween in a common area of an opening of the hub when the magnetic tape cassette is loaded in both forward and backward orientations, and which provide an interval therebetween as a hub-pawl retaining groove into which one of the hub pawls projects from an inner periphery of the hub, one of the two plate-like portions being formed as a long plate-like portion whose projecting height is relatively high and the other plate-like portion being formed as a short plate-like portion whose projecting height is relatively low, and a first guiding inclined surface and a second guiding inclined surface for guiding the hub pawl into the hub-pawl retaining groove with respect to the loading of the magnetic tape cassette in both the forward and backward orientations, the first and second inclined surfaces being provided on side edges of at least the long plate-like portion on a distal end side thereof.

In addition, the above-objects can be attained by adding an arrangement in which each of the rotation-preventing projections has a structure in which respective proximal-end portions of the long plate-like portion and the short platelike portion, which are its constituent elements, are connected to each other by a connecting portion.

In a preferred embodiment of the invention, the cassette accommodating case has a thin structure in which recesses for receiving an enlarged-thickness portion of the cassette are formed in the casing section and the cover section, respectively, so as to allow the loading of the magnetic tape cassette in both the forward and backward orientations.

In another preferred embodiment of the invention, a backward-pressing surface for coming into contact with a front end of the enlarged-thickness portion of the magnetic tape cassette to press the magnetic tape cassette toward a rear face side of the cassette when the cover section is set in a closed state is provided on an inner wall surface of the cover section or the casing section which is located on a front surface side of the magnetic tape cassette, so as to restrict a transverse position of the magnetic tape cassette by clamping the magnetic tape cassette by cooperation between the backward-pressing surface and the rotation preventing projections.

In still another preferred embodiment of the invention, the backward-pressing surface is an inclined surface formed on a rib provided on a corner portion in the pocket of the cover section or a corner portion in the casing section, or an arrangement in which the backward-pressing surface is a radius surface in which a corner portion in the pocket of the cover lo section or a corner portion in the casing section is rounded.

The present invention also provides a cassette accommodating case including a cover section, which has a cover-side opposing wall arranged to extend along one surface of a magnetic tape cassette and a pocket capable of accommodating one end of the magnetic tape cassette on one end of the cover-side opposing wall, and a casing section which has a pair of rotation-preventing projections provided on a casing-side opposing wall facing the cover-side opposing wall to retain a pair of hubs of the magnetic tape cassette by engaging the hubs, the casing section being pivotally attached to the cover section in such a manner as to be capable of being opened and closed, the cassette accommodating case characterized in that a positioning projection for restricting a position of the magnetic tape cassette is provided on each of both side walls of the casing section, and the positioning projection has an inclined surface for pushing and urging the magnetic tape cassette by abutting against a front-side or a rear-side end of a side projection which is formed along a transverse direction on each of side surfaces of the magnetic tape cassette accommodated in advance in the cover section when the casing section is closed toward the cover section.

BRIEF DESCRIPTION OF DRAWING FIGURES

Figures 8A, 8B, 8C:
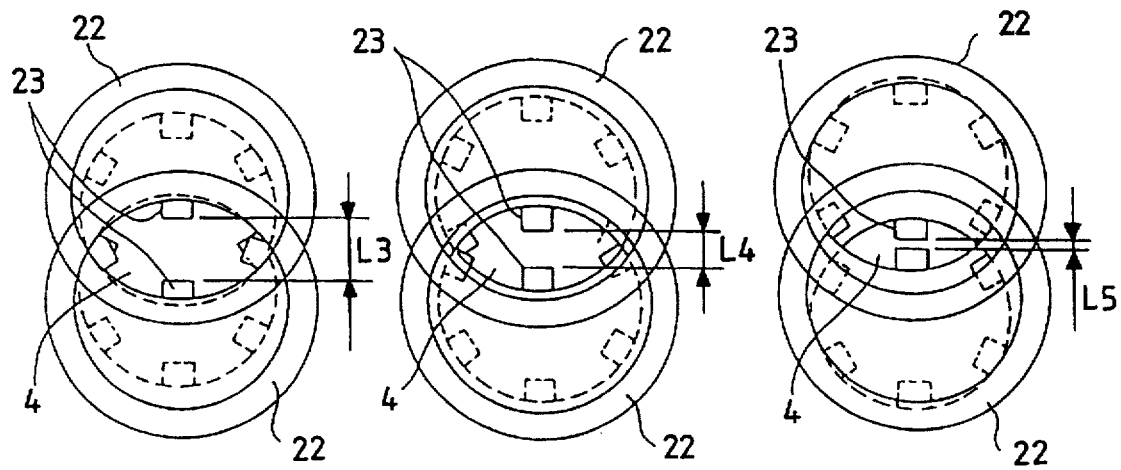
Figure 9:
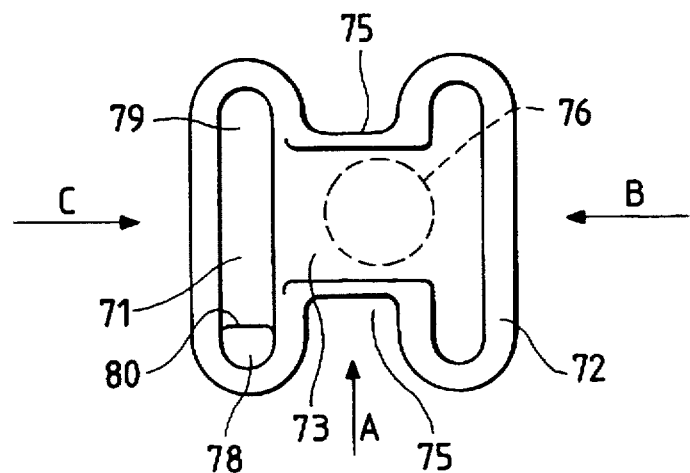
Figure 10:
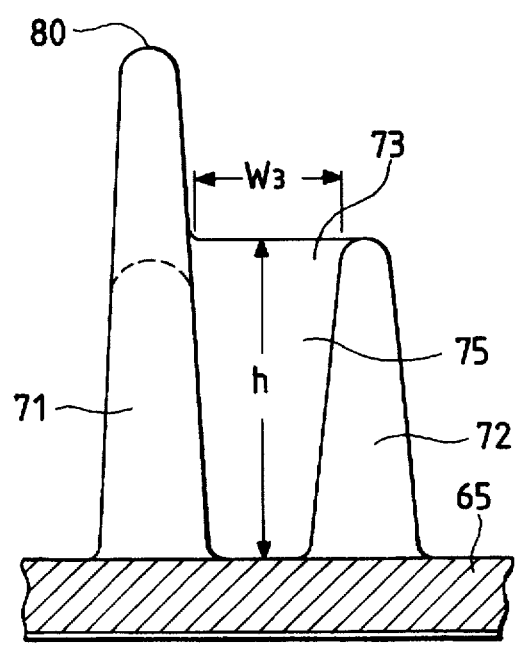
Figure 11:
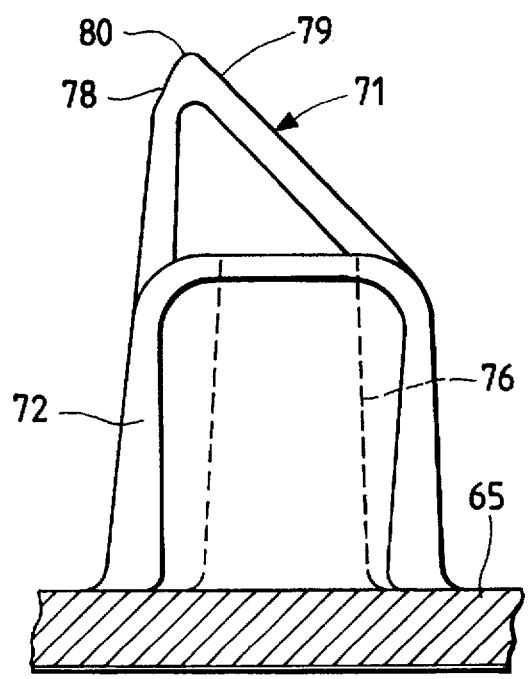
Figure 12:
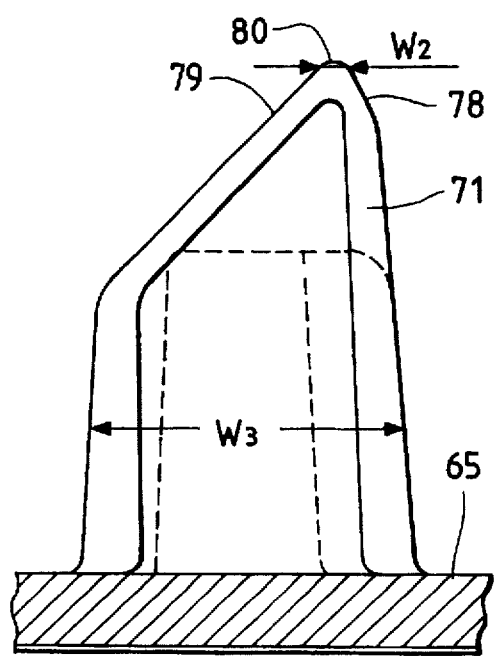
Figure 13A:
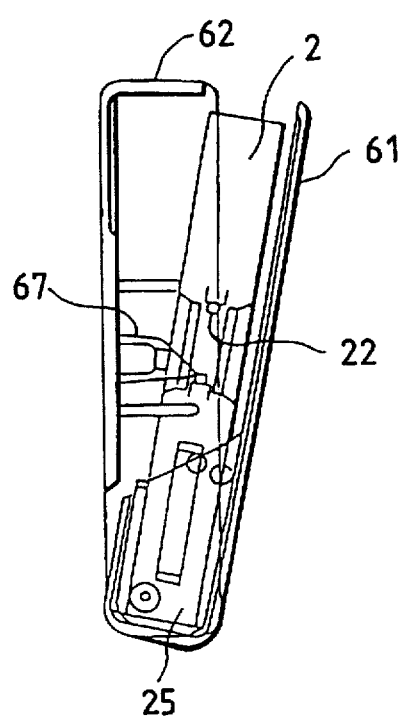
Figure 13B:
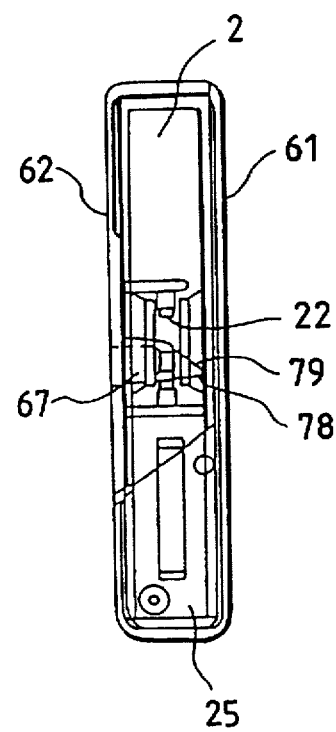
Figure 14:
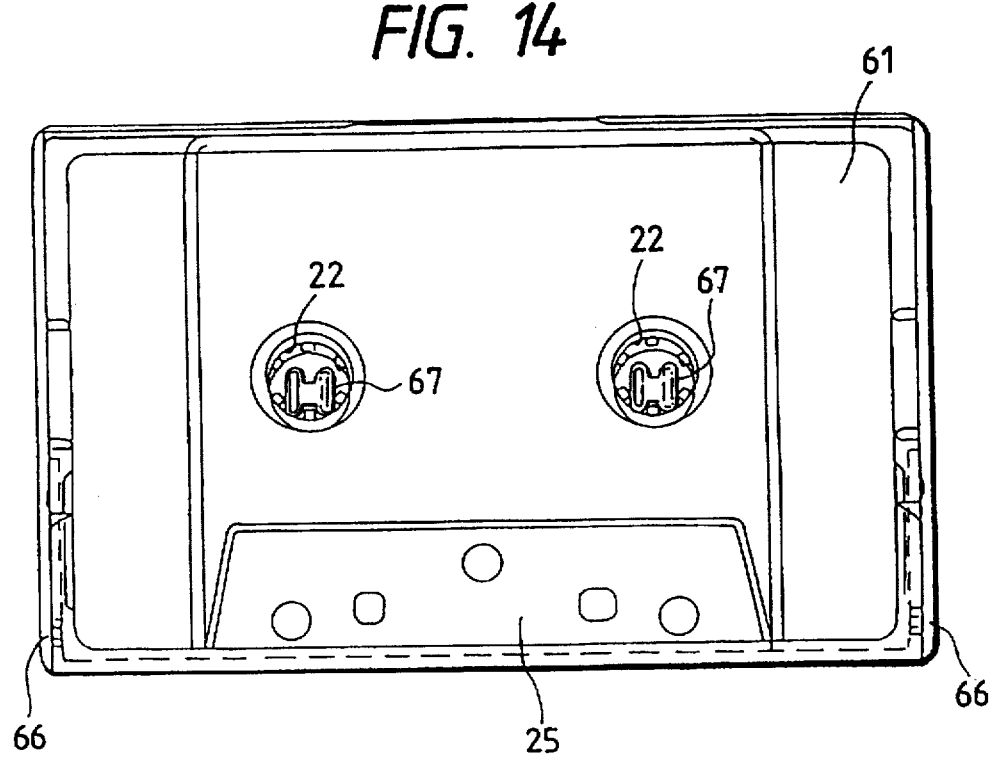
Figure 15:
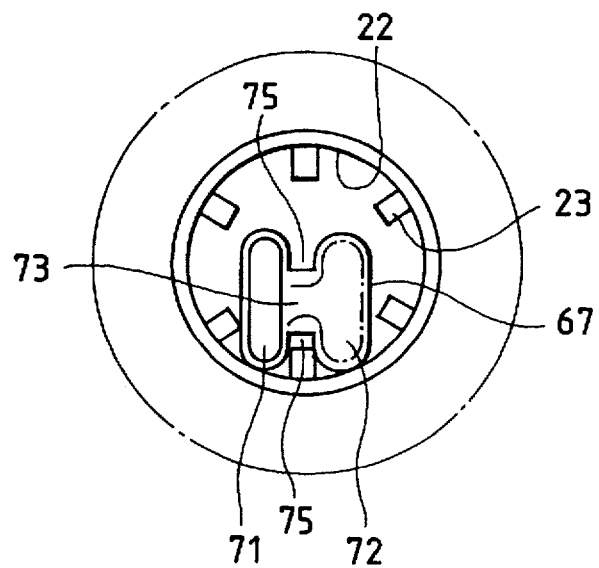
Figure 18:
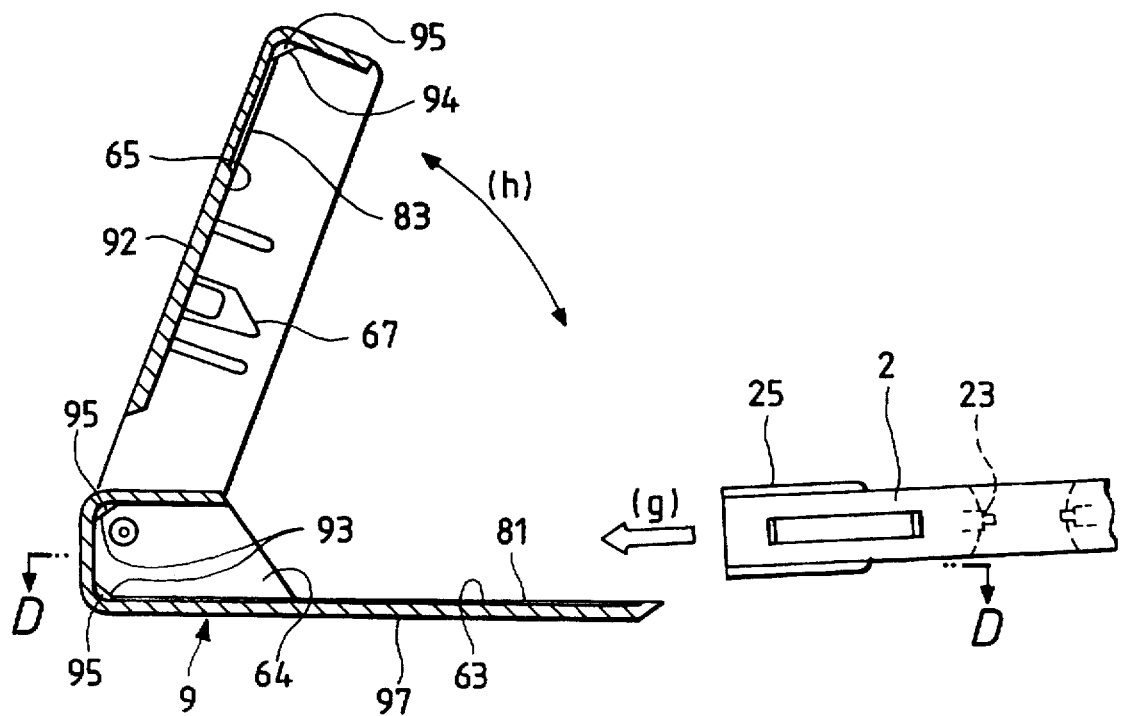
Figure 16A:
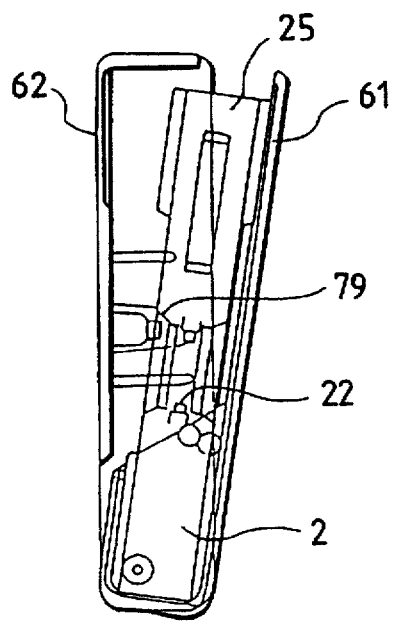
Figure 16B:
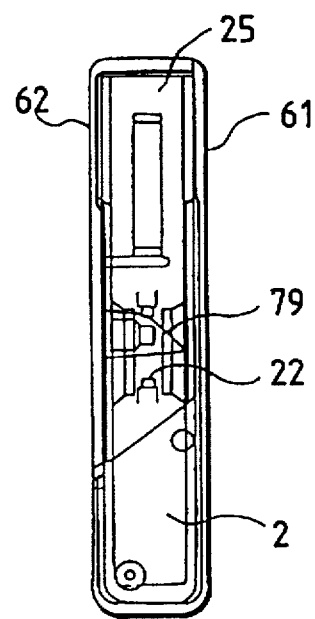
Figure 17:
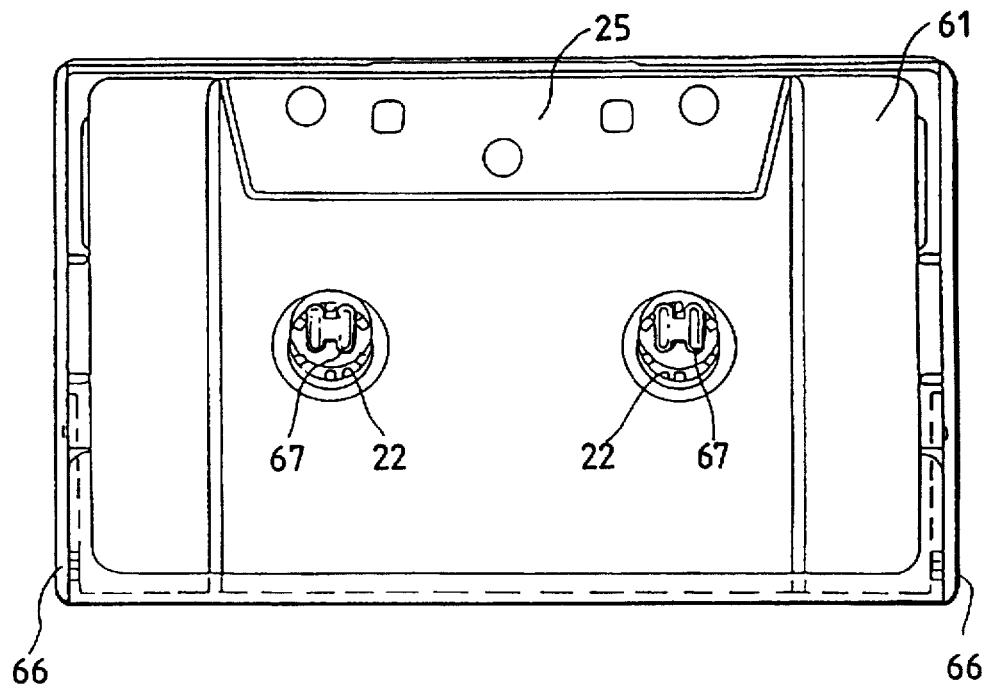
Figure 19:
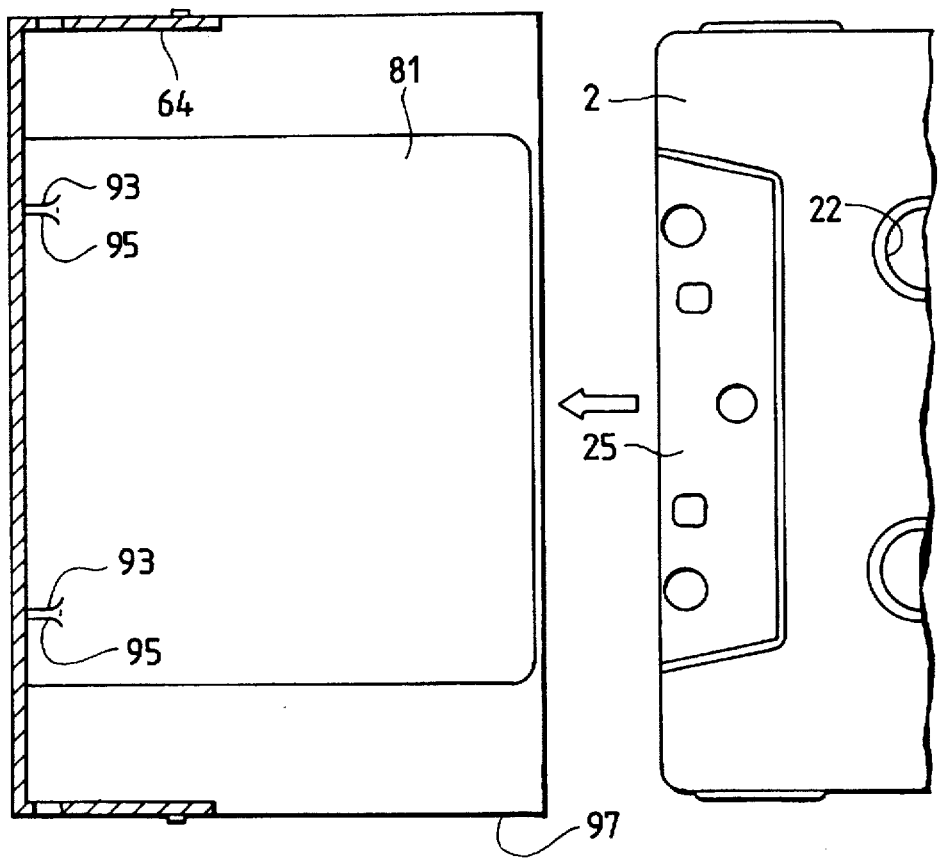
Figure 20:
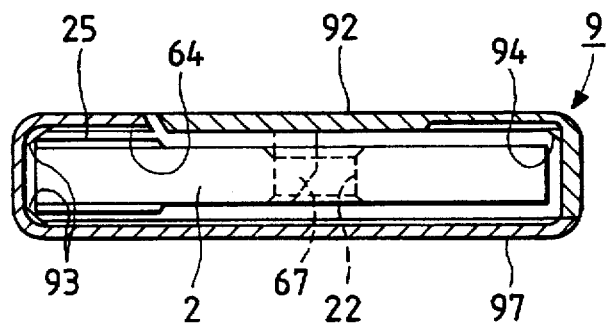
Figure 21A:
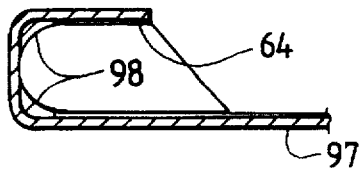
Figure 21B:
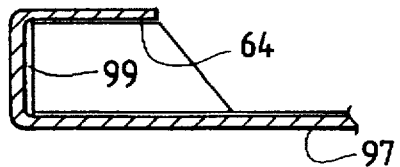
Figure 22:
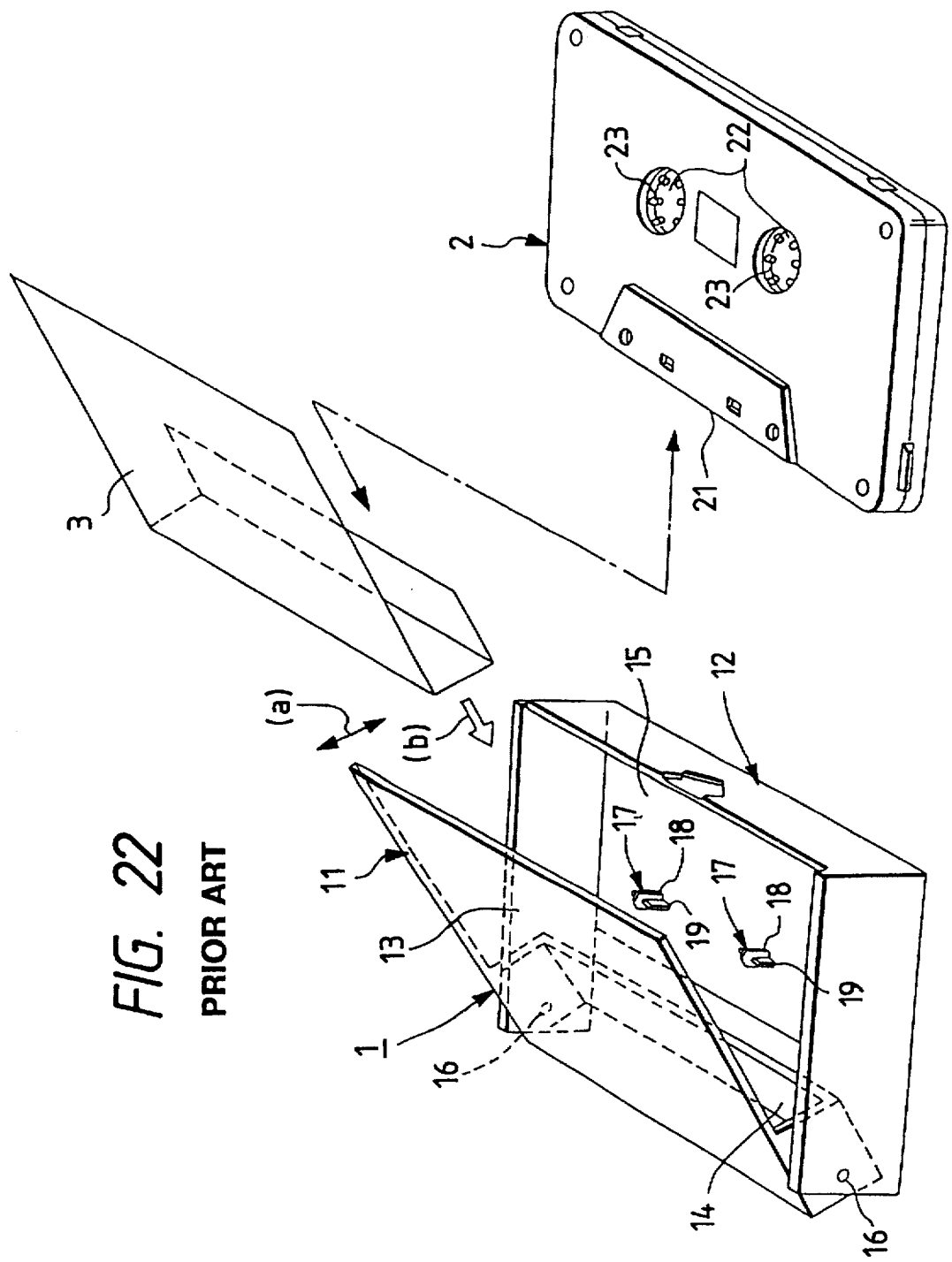
Figure 23:
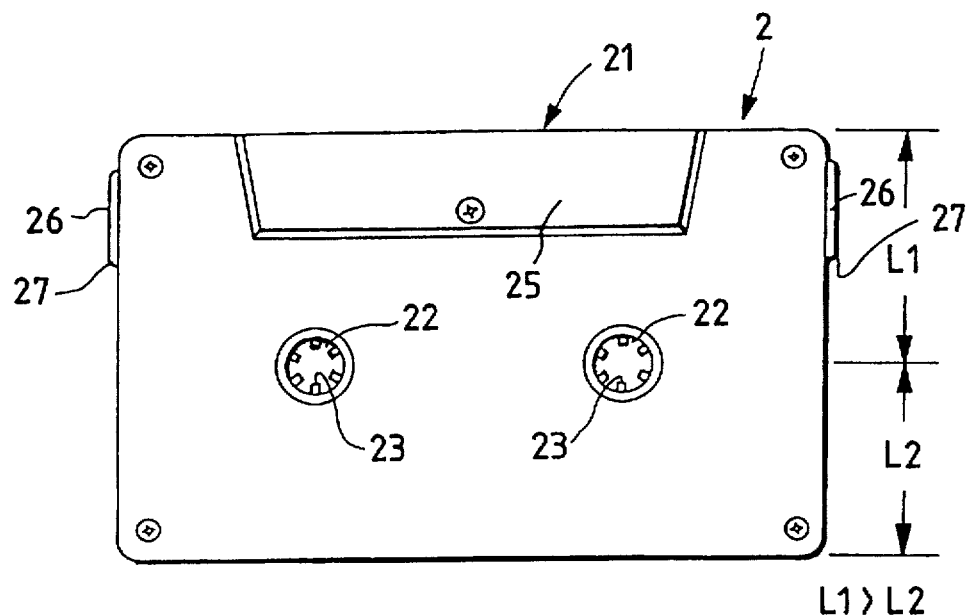
Figure 24:
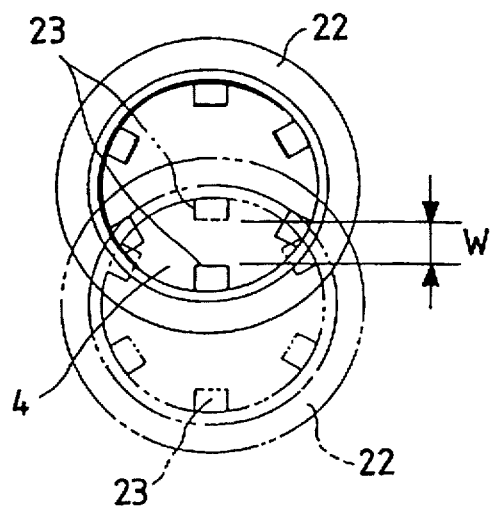
Figure 25:
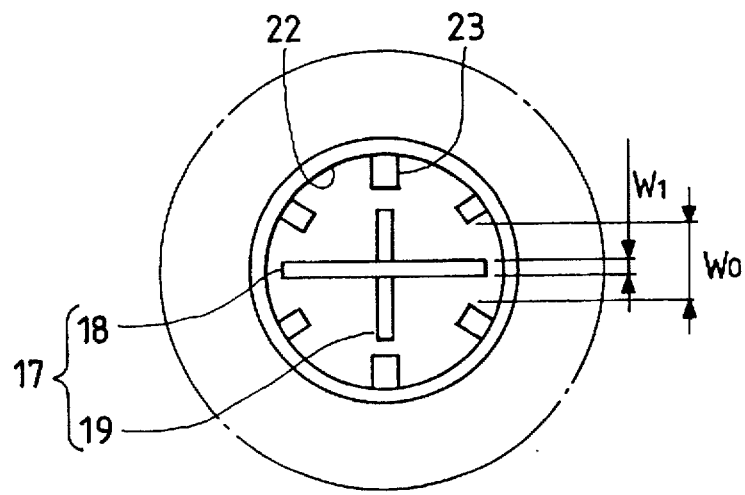
Figure 26:
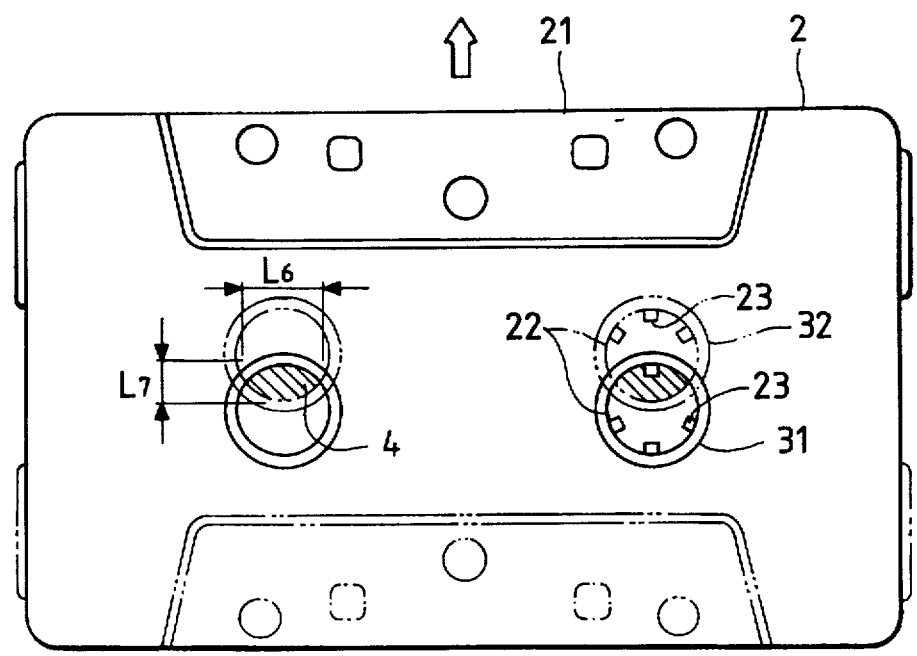

FIGS. 8(a), 8(b) and 8(c) are diagrams illustrating the extent of positional offset due to the difference in the loading orientation of the tape cassette;

FIG. 9 is an enlarged perspective view of an essential portion in accordance with the another embodiment of the present invention;

FIG. 10 is a view taken in the direction of arrow A in FIG. 9;

FIG. 11 is a view taken in the direction of arrow B in FIG. 9;

FIG. 12 is a view taken in the direction of arrow C in FIG. 9;

FIGS. 13(a) and 13(b) are diagrams illustrating the operation during loading in a forward orientation in accordance with another embodiment of the present invention;

FIG. 14 is a diagram illustrating a retained state of hubs during loadin the forward orientation in accordance with another embodiment of the present invention;

FIG. 15 is an enlarged view illustrating the retained state of the hub in accordance with the another embodiment of the present invention;

FIGS. 16(a) and 16(b) are diagrams illustrating the operation during loading in a backward orientation in accordance with the another embodiment of the present invention;

FIG. 17 is a diagram illustrating a retained state of the hubs during loading in the backward orientation in accordance with the another embodiment of the present invention;

FIG. 18 is a side elevational view of a preferred embodiment of the present invention;

FIG. 19 is a cross-sectional view taken along line D—D in FIG. 18;

FIG. 20 is a diagram illustrating the operation during loading in the forward orientation accordance with the preferred embodiment of the present invention;

FIGS. 21(a) and 21(b) are diagrams illustrating a modification of backward-pressing surfaces in accordance with the preferred embodiment of the present invention;

FIG. 22 a perspective view of a conventional accommodating case;

FIG. 23 is a side elevational view illustrating the position of hubs of the tape cassette;

FIG. 24 is an explanatory diagram illustrating the change in the shape of the hub corresponding to the accommodation of the tape cassette in the forward and backward orientations;

FIG. 25 is a diagram illustrating a problem in the conventional accommodating case; and FIG. 26 is a diagram illustrating the positions of the hubs of the tape cassette.

DETAILED DESCRIPTION OF THE PREFERRED EMBODIMENTS

Figure 6:
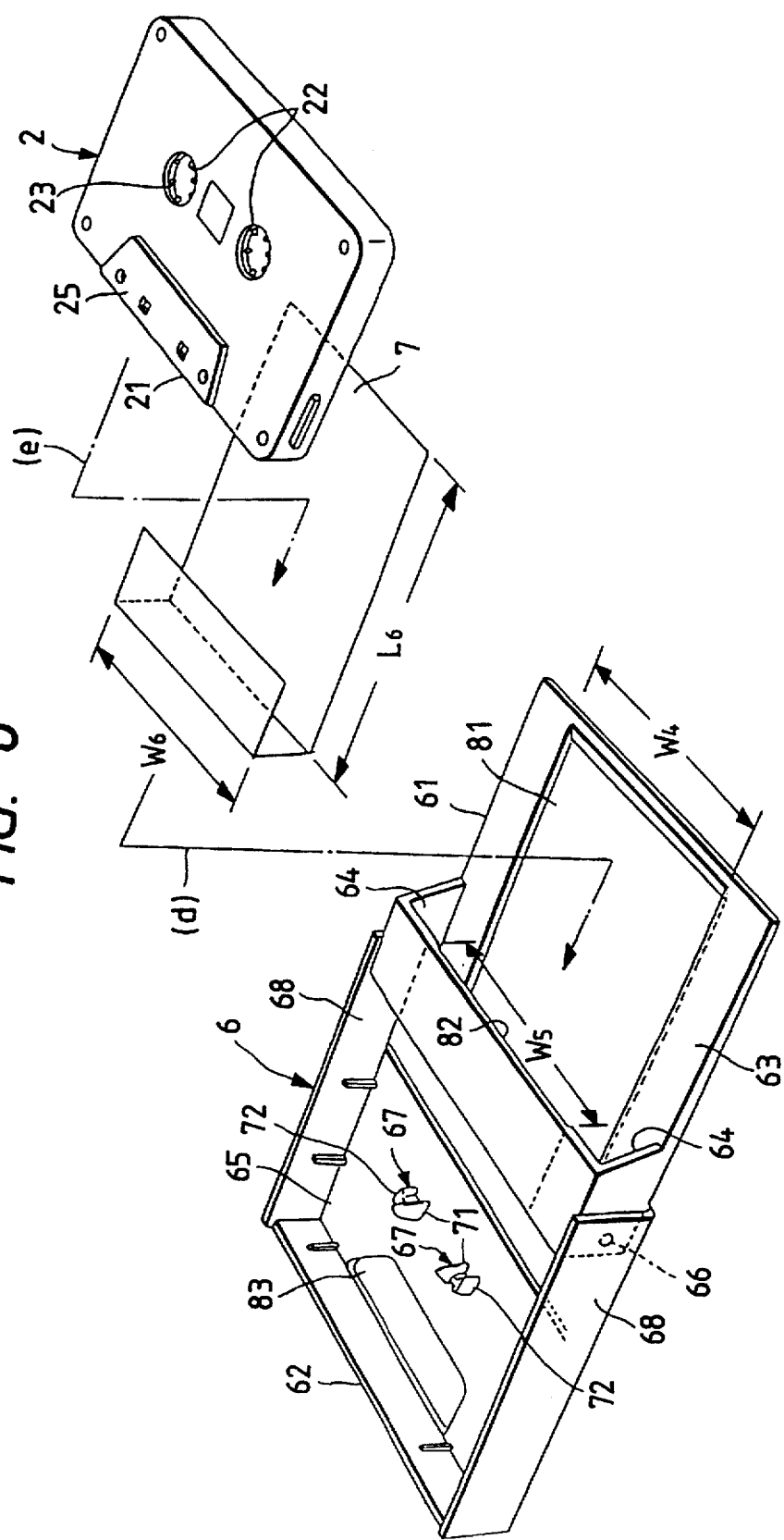
FIG. 6 is a perspective view of another embodiment of the present intention.

FIG. 6 shows a first embodiment of an accommodating case in accordance with the present invention.

As in the case of a conventional accommodating case, an accommodating case 6 in this embodiment is comprised of a cover section 61 and a casing section 62 rotatably connected to the cover section 61. The cover section 61 has a cover-side opposing wall 63 extending along one surface (a reverse side in the illustrated example) of a tape cassette 2 and a pocket 64 which is disposed on one end of the cover-side opposing wall 63 and into which a front opening portion 21 of the tape cassette 2 can be inserted. As shown in the drawing, an index card 7 and the tape cassette 2 are capable of being inserted into and drawn out of the pocket 64 along the cover-side opposing wall 63.

Figure 7:
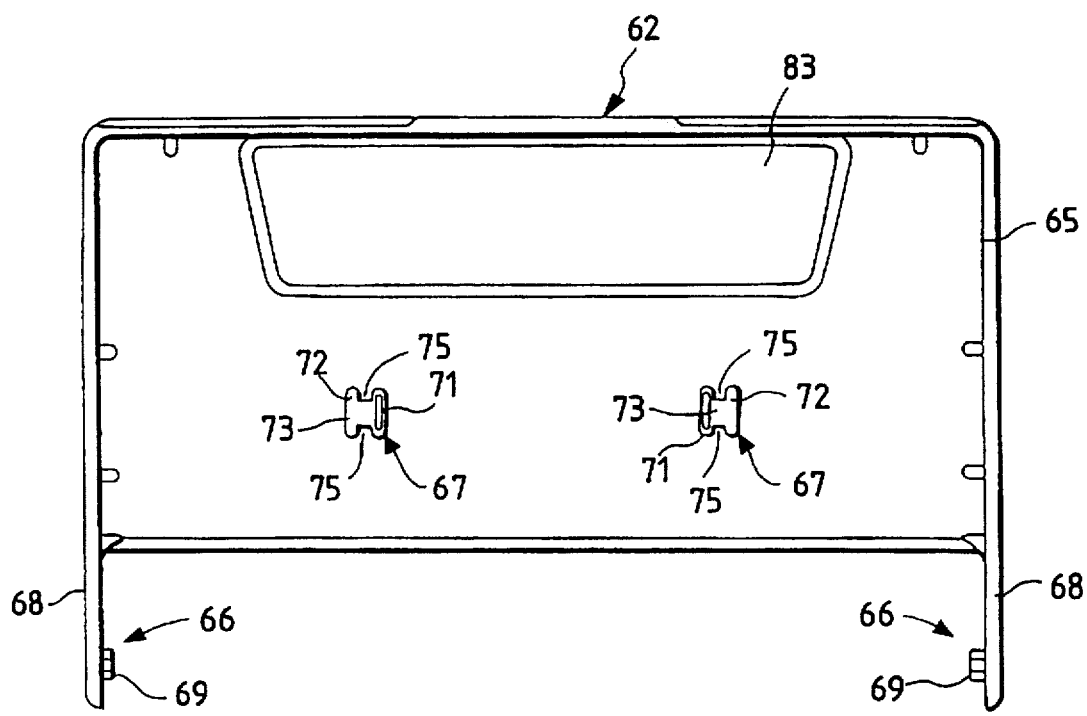
FIG. 7 is a plan view of a casing section in accordance with the FIG. 6X embodiment of the present invention.

The casing section 62 includes a casing-side opposing wall 65 for covering the other surface of the tape cassette 2 loaded in the cover section 61, a pair of pivotally attaching portions 66 for rotatably connecting the casing-side opposing wall 65 to the cover section 61, and a pair of rotation-preventing projections 67 which project from the casing-side opposing wall 65. As shown in FIG. 7, the pivotally attaching portions 66 are formed such that shaft-like projections 69 are formed on two side walls 68 of the casing section 62, respectively, and the shaft-like projections 69 are respectively fitted in shaft holes (not shown) formed in the two side walls of the pocket 64 of the cover section 61, thereby allowing the cover section 61 and the casing section 62 to be rotatably connected to each other.

The rotation-preventing projections 67 serve to prevent the slackening of the magnetic tape during storage by engaging hubs 22 of the tape cassette 2 loaded in the cover section 61 when the casing-side opposing wall 65 is closed with respect to the cover section 61 by being rotated by means of the pivotally attaching portions 66.

In this embodiment, the position where the highest part 80 of the rotation-preventing projections 67 project from the casing-side opposing wall 65 is set at a position corresponding to a common area, which includes both a forwardly loading area corresponding to the position of the hub at a time when the tape cassette 2 is loaded in the cover section 61 in the forward orientation (e.g., in the orientation in which the front opening portion 21 is inserted into the pocket 64) and a backwardly loading area corresponding to the position of the hub at a time when the tape cassette 2 is loaded in the cover section in the backward orientation. This is to ensure that the rotation-preventing projections 67 will engage the hubs 22 of the tape cassette 2 loaded in the cover section 61 even if the tape cassette 2 is loaded in the cover section 61 in either the forward or the backward orientation. This common area is a spindle-shaped (or elliptical) area 4 which is hatched in FIG. 26.

The hubs 22 are held in the tape cassette 2 in such a manner as to be movable in their radial directions within a specified range (i.e., they have slight play in the state in which they are held in the tape cassette 2). For this reason, as shown in FIG. 26, the dimension $L_6$ in the direction of the long axis of the common area 4 and the dimension $L_7$ in the direction of the short axis thereof change in correspondence with the amount of positional offset of each hub 22 within the tape cassette 2.

FIG. 8 shows the common area 4 which changes in correspondence with the amount of positional offset of the hub 22 within the tape cassette 2. That is, FIG. 8(a) shows the common area 4 when the hub 22 is positionally offset toward the rear-end side of the tape cassette 2 by a maximum degree. FIG. 8(b) shows the common area 4 when the hub 22 is not positionally offset (is located substantially in the center). FIG. 8(c) shows the common area 4 when the hub 22 is positionally offset toward the front-end side of the tape cassette 2 by a maximum degree. Each of the dimensions $L_3$, $L_4$, and $L_5$ in FIG. 8 shows an interval between the hub pawls 23 which project into the common area 4 when the loading orientation is changed.

As shown in FIGS. 9 to 12, the rotation-preventing projection 67 is comprised of two plate-like portions 71 and 72 which extend in parallel with each other with a predetermined interval therebetween in the common area 4 of the hub 22 when the tape cassette 2 is loaded in both the forward and backward orientations, as well as a connecting portion 73 which connects together the proximal-end sides of these two plate-like portions 71 and 72. The interval between the two plate-like portions 71 and 72 forms a hub-pawl retaining groove 75 into which one of the hub pawls 23 projects from the inner periphery of the hub 22. The projecting heights of the two plate-like portions 71 and 72 differ from each other, and one of the plate-like portions is formed as the long plate-like portion 71 whose projecting height is relatively high, while the other plate-like portion is formed as the short plate-like portion 72 whose projecting height is relatively low.

As for the connecting portion 73, as shown in FIG. 10, a maximum height "h" is set to be the same as the height of the short plate-like portion 72. In addition, as shown in FIG. 9, the connecting portion 73 connects the intermediate portions of the long plate-like portion 71 and the short plate-like portion 71, whereby the hub-pawl retaining grooves 75 are formed on both sides of the connecting portion 73, respectively. One of the hub pawls 23 is fitted in one of the hub-pawl retaining grooves 75 when, for example, the tape cassette 2 is loaded in the forward orientation, while one of the hub pawls 23 is fitted in the other hub-pawl retaining groove 75 when the tape cassette 2 is loaded in the backward orientation.

It should be noted that since the connecting portion 73 is arranged to have an appropriate breadth, the connecting portion 73 has large thickness and high strength in the accommodating case 6, so that it is possible to secure an area 76 with which an ejection pin is brought into contact when the molded part is removed from a mold after injection molding.

As shown in FIG. 10, the inner surfaces of the long plate-like portion 71 and the short plate-like portion 72, which make up the hub-pawl retaining groove 75, are formed as inclined surfaces which gradually narrow the groove width of the hub-pawl retaining groove 75 toward their proximal end sides. The groove width $W_3$ at an upper end of the hub-pawl retaining groove 75 is set to an appropriate value which is larger than the width of the hub pawl 23 so that the hub pawl 23 to be fitted in the groove will be guided quickly and easily into the groove without being caught by an upper end of the short plate-like portion 72 when the cover section 61 of the accommodating case 6 is closed. Meanwhile, the groove width on the lower-end side of the hub-pawl retaining groove 75 is set to such an appropriate value that the hub pawl 23 fitted in the hub-retaining groove 75 with the cover section 61 of the accommodating case 6 will not move with play.

When the tape cassette 2 is loaded in the forward orientation, the front opening portion 21 of the tape cassette 2 is inserted into the pocket with the pocket 64 set on the lower side, for instance. Since the hubs 22 are offset toward the pocket side at that time, a first guiding inclined surface 78 is provided at one side edge of each long plate-like portion 71 on the distal end side thereof, so as to guide the hub pawl 23 into the hub-pawl retaining groove 75 and adjust the position of the hub 22 by coming into contact with the inner peripheral surface of the hub 22. On the other hand, for loading the cassette 2 in the backward orientation, a second guiding inclined surface 79 is provided at the other side edge of the long plate-like portion 71 on the distal end side thereof, so as to guide the hub pawl 23 into the hub-pawl retaining groove 75 and adjust the position of the hub 22 by coming into contact with the inner peripheral surface of the hub 22.

The distal end portion of the long plate-like portion 71 is formed into a triangular shape by the first guiding inclined surface 78 from the highest part 80 and the second guiding inclined surface 79 from the part 80, as shown in FIG. 12. As for the plate width (the width dimension in the left-and-right direction in FIG. 12) of the long plate-like portion 71, a dimensional setting is provided such that the plate width $W_2$ on the distal-end side of the long plate-like portion 71 is smaller than the dimension of the minimum common area 4 shown in FIG. 8(c), while the plate width $W_3$ on the proximal side of the long plate-like portion 71 corresponds to or is larger than the dimension of the maximum common area 4 shown in FIG. 8(a). Accordingly, by virtue of such a dimensional setting, the long plate-like portion 71 guides the hub 22 during engagement with the hub 22 and corrects the positional offset of the hub 22 in such a manner as to make the positional offset large as in the state shown in FIG. 8(a), thereby making it possible to very reliably prevent the movement with play and rotation of the hub 22 in a finally retained state.

In addition, as shown in FIG. 6, the cover-side opposing wall 63, the pocket 64, and the casing-side opposing wall 65 are respectively provided with recesses 81, 82, and 83 for receiving an enlarged-thickness portion 25 of the tape cassette 2 so as to allow the loading of the tape cassette 2 into the cover section 61 in either the forward orientation or the backward orientation.

As shown in FIG. 6, the recess 82 provided in the pocket 64 receives the enlarged-thickness portion 25 during loading in the forward orientation when the front opening portion 21 of the tape cassette 2 is inserted into the pocket 64. Meanwhile, the recess 83 provided in the casing-side opposing wall 65 receives the enlarged-thickness portion 25 during loading in the backward orientation when the rear-end side of the tape cassette 2 is inserted into the pocket 64 (i.e., the front opening portion 21 is located at the open-end side of the case).

However, the recess 81 provided in the cover-side opposing wall 63 is formed as a single rectangular recess which combines a forward-loading recess for receiving the enlarged-thickness portion 25 during loading in the forward orientation and a backward-loading recess for receiving the enlarged-thickness portion during loading in the backward orientation. In these recesses 81 and 82, the width dimensions $W_4$ and $W_5$ are set to be equal.

In addition, as for an index card 7, a width dimension $W_6$ thereof, for instance, is set to be slightly smaller than the width dimension $W_4$ of the recess 81, and a length $L_6$ thereof extending along the cover-side opposing wall 63 is also set to be slightly smaller than the lengthwise dimension of the recess 81.

The arrows (d) and (e) in FIG. 6 respectively indicate the direction in which the index card 7 is inserted into the cover section 61 and the direction in which the tape cassette 2 is inserted into the cover section 61.

In the accommodating case 6 of this embodiment which is arranged as described above, the position at which the rotation-preventing projection 67 projects is set in the common area 4 which combines the forward-loading area corresponding to the position of the hub when the tape cassette 2 is loaded into the cover section 61 in the forward orientation and the backward-loading area corresponding to the position of the hub when it is loaded in the cover section in the backward orientation. At the same time, a portion of the plate-like portion projects upward, and its upper-end portion is formed as a slim shape which is appropriately pointed. For this reason, as for the rotation-preventing projection 67, even if the tape cassette 2 is loaded into the cover section 61 in either the forward orientation or the backward orientation, the pointed portion of the rotation-preventing projection 67 enters the hole portion of the hub 22 of the tape cassette 2 loaded in the cover section 61. At the same time, the rotation-preventing projection 67 is engaged at a proper position without such as being caught by the hub pawl 23. Accordingly, the tape cassette 2 can be inserted in both the forward orientation and the backward orientation, and the hubs can be retained reliably, so that the handling efficiency is much improved.

Referring to FIG. 13, the operation of the rotation preventing projection 67 will be described concretely.

At the time of engagement of the rotation-preventing projection 67 with the hub 22, when the tape cassette 2 is loaded in the forward orientation, as shown in FIGS. 13(a) and 13(b), only the first guiding inclined surface 78 of the long plate-like portion 71 in the rotation-preventing projection 67 is first brought into contact with the inner peripheral surface of the hub, thereby correcting the positional offset of the hub to a fixed state. Then, one of the hub pawls 23 which projects from the inner periphery of the hub 22 is guided into the groove by means of the inclined surfaces of the two plate-like portions 71 and 72 constituting the hub-pawl retaining groove 75, and is substantially fixed by being nipped in the hub-pawl retaining groove 75. In a final stage, edges on one side of the two plate-like portions 71 and 72 are brought into contact with the inner peripheral surface of the hub 22, and the hub-pawl retaining groove 75 nips the hub pawl 23. Consequently, the hub 22 of the tape cassette 2 is accurately positioned and fixed, as shown in FIGS. 14 and 15.

That is, when the fitting of the rotation-preventing projection 67 in the hub 22 is started, the amount of contacting portions is small, and the amount of contacting portions increases as the fitting advances and the positional offset of the hub 22 comes to be corrected. Hence, it is possible to prevent the occurrence of trouble such as catching, and to accurately position and fix the hub 22, with the result that it is possible to more reliably prevent the slackening of the tape due to the rotation of the hub 22 and the collision against the cassette case due to the movement with play of the hub 22.

When the tape cassette 2 is loaded in the backward orientation, as shown in FIGS. 16(a) and 16(b), only the second guiding inclined surface 79 of the long plate-like portion 71 in the rotation-preventing projection 67 is first brought into contact with the inner peripheral surface of the hub, thereby correcting the positional offset of the hub to a fixed state. Then, the hub pawl 23 is guided by and fixed in the hub-pawl retaining groove 75, and in the same way as in the loading in the forward orientation, the hub 22 of the tape cassette 2 can be more accurately positioned and fixed, as shown in FIG. 17. Thus, it is possible to prevent the slackening of the tape due to the rotation of the hub 22 and the collision against the cassette case due to the movement with play of the hub 22.

In the above-described embodiment, the proximal-end sides of the two plate-like portions 71 and 72 constituting the rotation-preventing projection 67 are connected by the connecting portion, so that the strength of the rotation preventing projection 67 is enhanced. For this reason, and also because the portions of the rotation-preventing projection 67 contacting the hub 22 abut against not only the hub pawl portions but also the inner peripheral wall portion of the hub, it is possible to position and fix the hub 22 more securely, and it is possible to improve the performance such as shock resistance during use.

Furthermore, in the above-described embodiment, since the enlarged-thickness portion 25 of the tape cassette 2 is received by the recesses 81, 82, and 83 that are formed in the cover section 61 and the casing section 62, the overall accommodating case 6 is made slim, thereby reducing the storage space and improving the portability. In addition, although a description has been given of the arrangement in which the front side or the rear side of the magnetic tape cassette 2 is inserted into the pocket 64 (the arrangement in which the axis of rotation of the pivotally attaching portions of the accommodating case is parallel with the longitudinal direction of the cassette), this embodiment is also applicable to an accommodating case of the type in which the axis of rotation of the pivotally attaching portions is parallel with the transverse direction of the cassette (the type in which the left- or right-hand side end portion of the cassette is inserted into the pocket). Moreover, the present invention is naturally applicable to an accommodating case of a structure which is not made slim unlike the above-described embodiment.

Although, in the above-described embodiment, the structure adopted is such that the two plate-like portions 71 and 72 in the rotation-preventing projection 67 are connected by the connecting portion 73 whose height is substantially identical to the height of the lower plate-like portion, the present invention is not limited to such a structure, and it goes without saying that various modifications are possible.

As described above, in the cassette accommodating case in accordance with the present invention, since the position at which the rotation-preventing projection projects is set in the common area which combines the forward-loading area corresponding to the position of the hub when the tape cassette is loaded into the cove section in the forward orientation and the backward-loading area corresponding to the position of the hub when it is loaded in the cover section in the backward orientation, the rotation-preventing projections are engaged with the hubs of the tape cassette loaded in the cover section even if the tape cassette is loaded into the cover section in either the forward orientation or the backward orientation. Accordingly, the tape cassette can be inserted in either the forward orientation or the backward orientation, so that the handling efficiency is much improved.

In addition, when the rotation-preventing projections are engaged with the hubs of the tape cassette, regardless of whether the tape cassette is loaded in the forward orientation or the backward orientation, only the first or second guiding inclined surface of the long plate-like portion in each of the rotation-preventing projections first abuts against the inner peripheral surface of the hub, thereby correcting the positional offset of the hubs. Then, the hub pawl provided on the inner periphery of the hub is guided into the groove by the inclined surfaces of the two plate-like portions which make up the hub-pawl retaining groove. In a final stage, edges on one side of the two plate-like portions are brought into contact with the inner peripheral surface of each hub, and the hub-pawl retaining groove nips the hub pawl so as to position and fix each hub.

That is, when the fitting of the rotation-preventing projection in the hub is started, the amount of contacting portions is small, and the amount of contacting portions increases as the fitting advances and the positional offset of the hub is corrected. Hence, it is possible to prevent catching the hub pawls during fitting, and to accurately position and fix the hubs, with the result that it is possible to more reliably prevent slackening of the tape due to the rotation of the hubs and the collision against the cassette case due to the movement or play of the hubs.

Furthermore, since the arrangement provided is such that the proximal-end sides of the two plate-like portions constituting the rotation-preventing projection are connected by the connecting portion, the strength of the rotation-preventing projection can be enhanced. At the same time, since portions which abut against the hub can be increased, it is possible to position and fix the hubs more securely, and it is possible to improve the performance such as shock resistance during use.

FIGS. 18 to 20 show a preferred embodiment of the accommodating case in accordance with the present invention.

An accommodating case 9 in this embodiment is comprised of a cover section 97 which has the cover-side opposing wall 63 extending along one surface of the tape cassette 2 and the pocket 64 into which one end of the tape cassette 2 can be inserted on one end side of the cover-side opposing wall 63, as well as a casing section 92 which has the pair of rotation-preventing projections 67 provided on the casing-side opposing wall 65 facing the cover-side opposing wall 63 to retain the pair of hubs 22 of the tape cassette 2 by entering and engaging the hubs 22, the casing section 92 being pivotally attached to the cover section 97 in such a manner as to be capable of being opened and closed.

The arrow (g) in FIG. 18 indicates the direction in which the tape cassette 2 is inserted, while double-headed arrow (h) indicates the directions in which the accommodating case 9 is opened and closed.

In the case of the cover section 97, a backward-pressing surface 93 is provided on each of two corner portions of the pocket 64 which is located on the front side of the tape cassette 2 during the loading of the tape cassette 2 in the forward orientation. On the other hand, in the case of the casing section 92, backward-pressing surfaces 94 are provided on a corner portion which is located on the front side of the tape cassette 2 during the loading of the tape cassette 2 in the backward orientation.

As for the cover section 97, the arrangements are similar to those of the cover section 61 in accordance with the embodiment shown in FIG. 6, except that the backward-pressing surfaces 93 are provided, so that the common arrangements will be denoted by the same reference numerals, and a description thereof will be omitted.

On the other hand, as for the casing section 92, the arrangements are similar to those of the casing section 62 in accordance with the embodiment shown in FIG. 6, except that the backward-pressing surfaces 94 are provided, so that the common arrangements will be denoted by the same reference numerals, and a description thereof will be omitted.

Hereafter, a detailed description will be given of the backward-pressing surfaces 93 and 94.

The backward-pressing surface 93 is an inclined surface formed on a substantially triangular rib 95 provided on the corner portion of the pocket 64. As also shown in FIG. 20, when the cover section 97 is set in the closed state, the backward-pressing surfaces 93 contact the front end of the enlarged-thickness portion 25 of the tape cassette 2 loaded in the forward orientation and to press the tape cassette 2 toward the rear side of the cassette, so as to restrict the transverse movement of the tape cassette 2 in cooperation with the rotation-preventing projections 67.

The backward-pressing surface 94 is also an inclined surface formed on the substantially triangular rib 95 provided on the corner portion in the same way as the backward-pressing surface 93. In the case of this backward-pressing surface 94, when the cover section 97 is set in the closed state, the backward-pressing surface 94 contacts the front end of the enlarged-thickness portion 25 of the tape cassette 2 loaded in the backward orientation to press the tape cassette 2 toward the rear side of the cassette, so as to restrict the transverse movement of the tape cassette 2 in cooperation with the rotation-preventing projections 67.

As for the ribs 95, two ribs are provided for each of the corner portions.

It should be noted that the dimensional setting of each of the ribs 95 is provided such that the rear-end portion of the tape cassette 2 will not be pressed in the case where the tape cassette 2 is loaded in an orientation opposite to a predetermined orientation, and either the backward-pressing surfaces 93 or the backward-pressing surface 94 is spaced from the rear side of the tape cassette 2, as shown in FIG. 20. This is because the thickness dimension of the tape cassette 2 is greatest at the portion of the enlarged-thickness portion 25.

As described in the foregoing embodiment, when the cover section of the accommodating case is closed, parts of the rotation-preventing projections 67 are brought into contact with the inner peripheral surfaces of the hubs 22 so as to adjust the positions of the hubs 22, thereby reliably performing the positioning and fixing of the hubs 22. However, since the hubs 22 of the tape cassette 2 are held in cassette halves so as to be able to move radially within predetermined ranges, even if the hubs 22 are accurately positioned and fixed, if there is a clearance between the cassette half and the hubs 22, the effect of positioning and fixing the hub 22 by means of the rotation-preventing projections 67 would be reduced.

By way of contrast, in the accommodating case 9 of this embodiment, when the cover section 97 is closed, the tape cassette 2 is restricted in transverse direction between the rotation-preventing projections 67 and the backward-pressing surfaces 93 provided in the cover section 97 or the backward pressing surface 94 provided in the casing section 92 so as to restrict the transverse movement of the tape cassette 2. At the same time, the cassette halves of the tape cassette 2 can be securely positioned and fixed in the accommodating case 9 such that the clearance between the cassette halves and the hubs 22 of the tape cassette 2 is minimized. Hence, it is possible to prevent slackening of the tape due to the clearance between the cassette halves and the hubs 22 of the tape cassette 2 during carrying or the like, and it is possible to improve the shock resistance of the accommodating case.

In addition, the cover-side opposing wall 63 and the casing-side opposing wall 65 of the accommodating case 9 are usually thin to produce a slim case, and it thus becomes difficult to maintain their strength and rigidity. However, in this embodiment, backward-pressing surfaces 93 and 94 are provided by the ribs 95 so that it is possible to reinforce the cover-side opposing wall 63 and the casing-side opposing wall 65. Thus, the strength of the case is much improved.

The structure for providing the backward-pressing surfaces 93 and 94 is not limited to the arrangement of the embodiment shown in FIGS. 18 and 19. For example, as shown in FIG. 21(a), a radius surface 98 in which the corner portion is rounded may be made to function as the backward-pressing surface. Still alternatively, as shown in FIG. 21(b), an end face of a substantially rectangular plate-like rib 99, which projects from the inner side wall surface such as the one provided in a conventional accommodating case, may be made to function as the backward-pressing surface.

In the above-described accommodating case 9, the backward-pressing surfaces 93 and 94 are provided in the cover section 97 and the casing section 92, respectively, for loading the tape cassette 2 in the forward orientation and the backward orientation. However, the technique of fixing the cassette halves by clamping by the backward-pressing surface(s) and the rotation-preventing projections 67 can also be applied to accommodating cases of the type in which tape cassette 2 can be loaded only in either one of the forward orientation and the backward orientation. In that case, it suffices if the backward-pressing surfaces or the backward-pressing surface is provided in either one of the cover section or the casing section which make up the accommodating case.

In addition, in the above-described accommodating case 9, although the arrangement adopted is such that the backward-pressing surfaces 93 are respectively provided for the two corner portions for clamping the front end face of the tape cassette 2, if only the transverse position of the tape cassette 2 is to be restricted, an arrangement may be adopted in which the backward-pressing surface 93 is provided only for either one of the corner portions. Nevertheless, in the case where the arrangement adopted is such that the backward-pressing surfaces 93 are respectively provided for the two corner portions for clamping the front end face of the tape cassette 2, as in the case of the accommodating case 9, it is possible to not only restrict the transverse position of the tape cassette 2 but also restrict the position of the tape cassette 2 in the thickness direction, so that it is possible to further reduce the movement of the tape cassette 2 with play within the accommodating case 9.

Furthermore, in the case where the radius surfaces 96 shown in FIG. 21(a) are made to function as the backward-pressing surfaces 93 and 94 and the like, it is unnecessary to strictly form folds of the index card (not shown) to be accommodated in the accommodating case 9. Thus, it is possible to overcome the inconvenience that the index card is difficult to fit due to the formed folds of the index card.

As described above, in the cassette accommodating case in accordance with the present invention, since the position at which the rotation-preventing projection projects is set in the common area which combines the forward-loading area corresponding to the position of the hub when the tape cassette is loaded into the cover section in the forward orientation and the backward-loading area corresponding to the position of the hub when it is loaded in the cover section in the backward orientation, the rotation-preventing projections are engaged with the hubs of the tape cassette loaded in the cover section even if the tape cassette is loaded into the cover section in either the forward orientation or the backward orientation. Accordingly, the tape cassette can be inserted in ether the forward orientation or the backward orientation, so that the handling efficiency is greatly improved.

In addition, when the rotation-preventing projections are engaged with the hubs of the tape cassette, regardless of whether the tape cassette is loaded in the forward orientation or the backward orientation, only the first or second guiding inclined surface of the long plate-like portion in each of the rotation-preventing projections first abuts against the inner peripheral surface of the hub, thereby correcting the positional offset of the hubs. Then, the hub pawl provided on the inner periphery of the hub is guided into the groove by the inclined surfaces of the two plate-like portions which make up the hub-pawl retaining groove. In a final stage, edges on one side of the two plate-like portions are brought into contact with the inner peripheral surface of each hub, and the hub-pawl retaining groove nips the hub pawl so as to position and fix each hub.

Thus, when the rotation-preventing projection is first inserted in the hub, the contacting portion is small, and the contacting portion increases as the fitting advances and the positional offset of the hub is corrected. Hence, it is possible to prevent the occurrence of trouble such as catching during fitting, and to accurately position and fix the hubs, with the result that it is possible to more reliably prevent slackening of the tape due to the rotation of the hubs and collision of the tape against the cassette case due to the movement or play of the hubs.

Further, since the arrangement provided is such that the proximal-end sides of the two plate-like portions constituting the rotation-preventing projection are connected by the connecting portion, the strength of the rotation-preventing projection can be enhanced. At the same time, since portions which abut against the hub can be increased, it is possible to position and fix the hubs more securely, and it is possible to improve the shock resistance of the case during use.

Furthermore, when the cover section of the accommodating case is set in the closed state, movement of the tape cassette is restricted by cooperation between the rotation-preventing projections of the casing section and the backward-pressing surface provided in the cover section or the casing section of the accommodating case so as to restrict transverse movement of the tape cassette, and the hubs of the tape cassette can be positioned and fixed by the rotation-preventing projections. At the same time, the cassette halves of the tape cassette can be securely positioned and fixed in the accommodating case such that the clearance between the cassette halves and the hubs of the tape cassette is minimized. Hence, it is possible to prevent the slackening of the tape due to the clearance between the cassette halves and the hubs of the tape cassette during carrying or the like, and it is possible to improve the shock resistance of the case.

In addition, the cover-side opposing wall and the casing-side opposing wall of the accommodating case can be made relatively thin in order to produce a slim case, and without sacrificing the strength of the case since the backward-pressing surfaces are provided by ribs on the inner wall surface of the case, which ribs reinforce the cover-side opposing wall and the casing-side opposing wall.

Furthermore, if the backward-pressing surfaces are respectively provided for the two corner portions for clamping the front end face of the tape cassette in the pocket, it is possible to not only restrict the movement of the tape cassette in the transverse direction but also in the thickness direction of the tape cassette, so that it is possible to further reduce movement or play of the tape cassette within the accommodating case.

Referring now to FIGS. 1 to 5, a description will be given of another embodiment of the present invention.

An accommodating case 60 in this embodiment is comprised of a cover section 61 and a casing section 62 rotatably connected to the cover section 61. The cover section 61 has a cover-side opposing wall 63 extending along one surface (a reverse side in the illustrated example) of a tape cassette 2 and a pocket 64 which is disposed on one end of the cover-side opposing wall 63 and into which a front opening portion 21 of the tape cassette 2 can be inserted. An index card 7 and the tape cassette 2 are capable of being inserted into and drawn out of the pocket 64 along the cover-side opposing wall 63.

The casing section 62 includes a casing-side opposing wall 65 for covering the other surface of the tape cassette 2 loaded in the cover section 61, a pair of pivotally attaching portions 66 for rotatably connecting the casing-side opposing wall 65 to the cover section 61, a pair of rotation-preventing projections 67 which project from the casing-side opposing wall 65, and two side walls 68 and a front side wall 69 which surround the casing-side opposing wall 65. Positioning projections 90 and 91, which will be described later, are provided along each of the two side walls 68.

The rotation-preventing projections 67 serve to prevent the slackening of the magnetic tape during storage by engaging hubs 22 of the tape cassette 2 loaded in the cover section 61 when the casing-side opposing wall 65 is closed with respect to the cover section 61 by being rotated by means of the pivotally attaching portions 66.

In this embodiment, as is explained herein before, the position where the rotation-preventing projection 67 project from the casing-side opposing wall 65 is set at a position corresponding to a common area 4, which includes both a forwardly loading area corresponding to the position of the hub at a time when the tape cassette 2 is loaded in the cover section 61 in the forward orientation (e.g., in the orientation in which the front opening portion 21 is inserted first into the pocket 64) and a backwardly loading area corresponding to the position of the hub at a time when the tape cassette 2 is loaded in the cover section in the backward orientation.

The positioning projections 90 and 91 are provided on an inner surface of each of the two side walls 68. The positioning projection 90 serves to push the tape cassette 2 toward the opening side when the tape cassette 2 is accommodated into the accommodating case 60 in the backward orientation (in the orientation in which the rear portion of the cassette is inserted into the pocket). A side surface of the positioning projection 90 which faces the opening side is formed as an inclined surface 95 having a desired angle. In addition, the positioning projection 91 serves to push the tape cassette 2 toward the pocket 64 side when the tape cassette 2 is accommodated into the accommodating case 60 in the forward orientation. A side surface of the positioning projection 91 which faces the pocket 64 side is formed as an inclined surface 96 having a desired angle.

Although the shape and the like of the tape cassette 2 is already known, a longitudinal side projection 26 is formed on each side thereof. The object pertaining to the present invention is attained by pushing the side projections 26 by means of the positioning projections 90 and 91 when the tape cassette 2 is accommodated.

Figure 1:
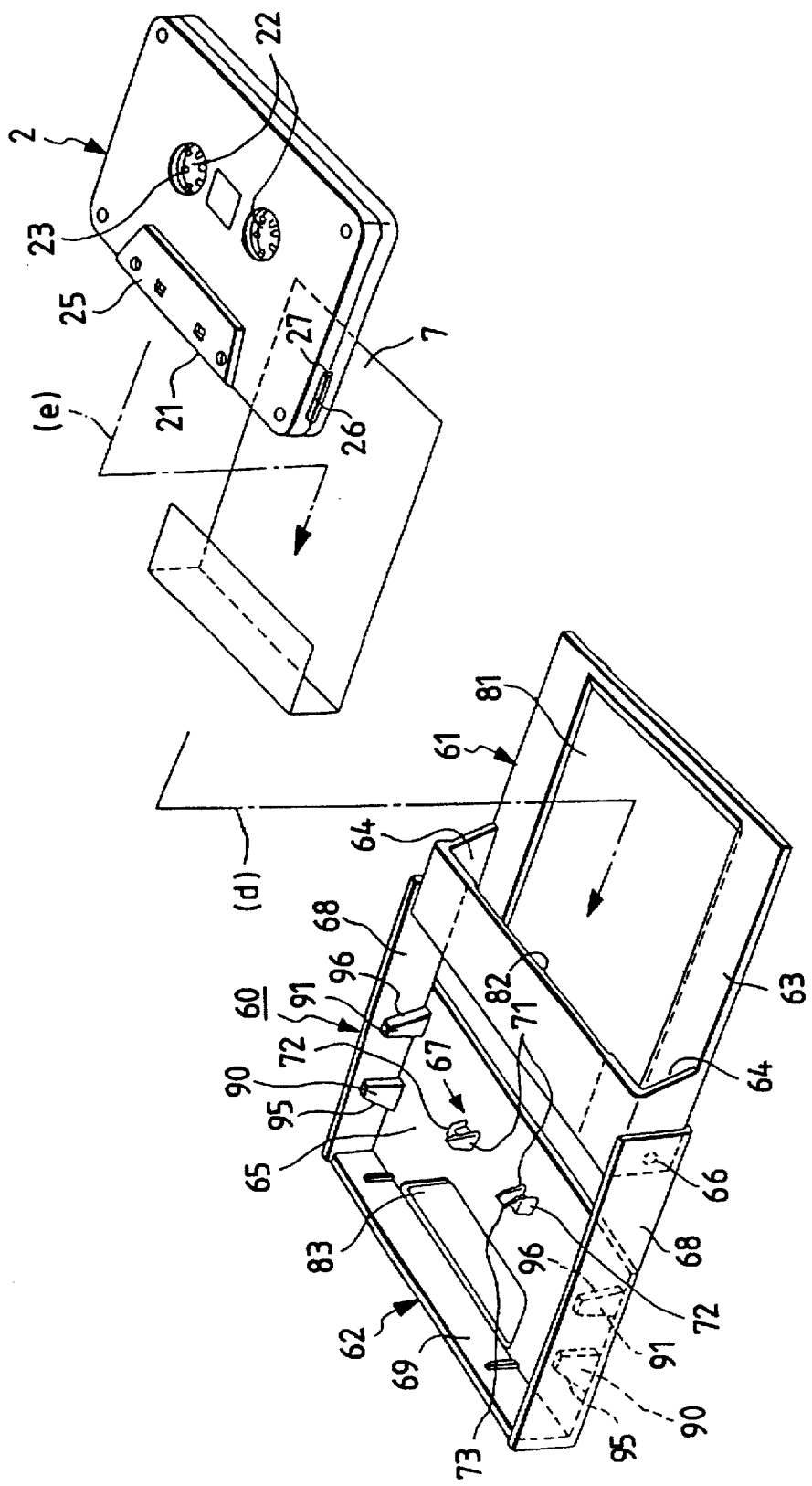
FIG. 1 is a perspective view of a cassette accommodating case illustrating an embodiment of the present invention.
Figure 2:
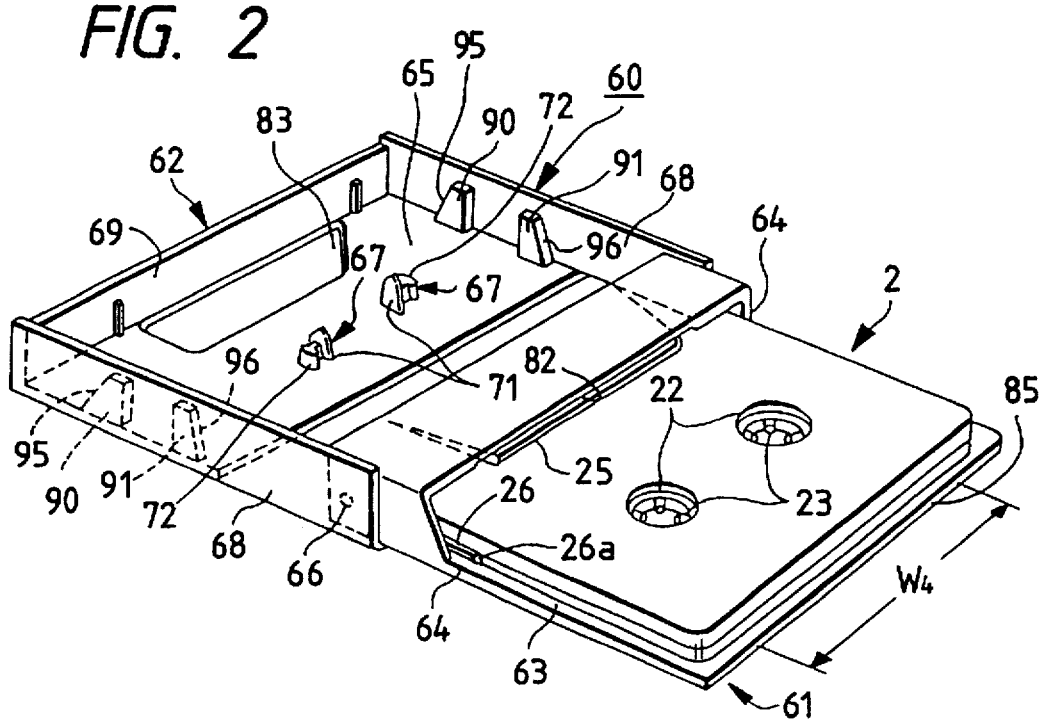
FIG. 2 is perspective view illustrating a state in which a tape cassette is accommodated in a forward orientation.
Figure 3:
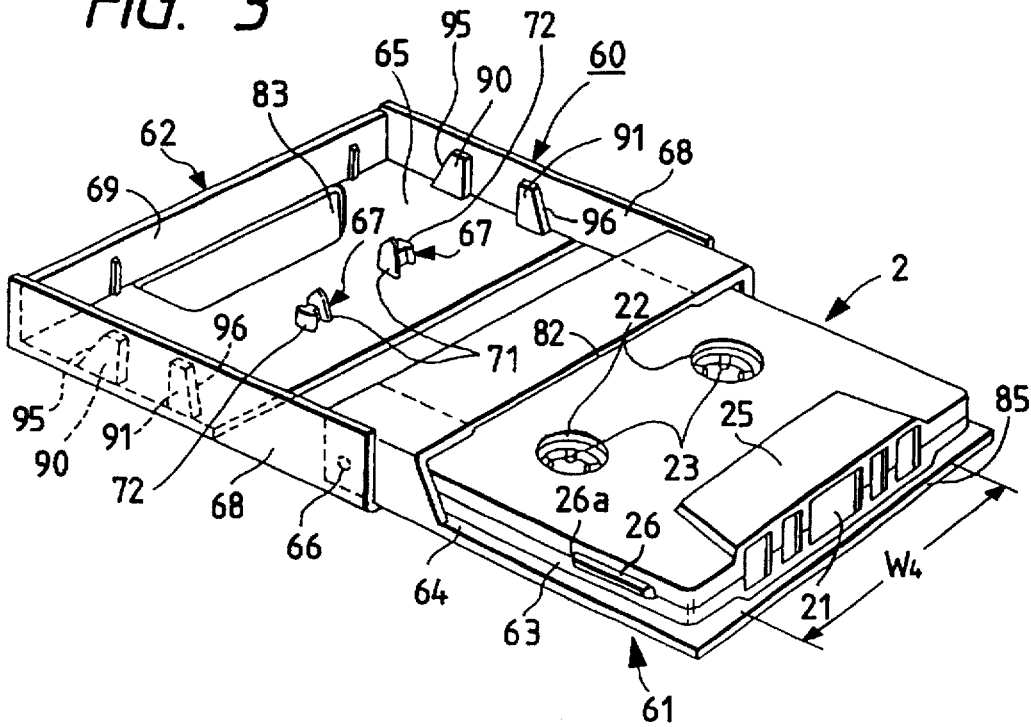
FIG. 3 is a perspective view illustrating a state in which the tape cassette is accommodated in a backward orientation.

Next, to describe the accommodation of the tape cassette 2, in a case where the tape cassette 2 is accommodated in the forward orientation, as shown in FIG. 2, the enlarged-thickness portion 25 is inserted into the pocket 64, and the cover section 61 and the casing section 62 are then closed together. On the other hand, in a case where the tape cassette 2 is accommodated in the backward orientation, as shown in FIG. 3, the rear-end portion of the tape cassette 2 is inserted into the pocket 64, the enlarged-thickness portion 25 is positioned on the opening side, and the cover section 61 and the casing section 62 are then closed together.

The insertion in the forward and backward orientations is effected in the above-described manner, and when the cover section 61 and the casing section 62 are closed together, the tape cassette 2 is pushed by the positioning projections 90 and 91, thereby allowing the common area 4 to be enlarged automatically.

First, referring to FIG. 4, a description will be given of the pushing operation when the tape cassette 2 is inserted in the forward orientation. It should be noted that, in FIG. 4, the illustration of the positioning projection 91 is omitted for the sake of clarity.

Figure 4:
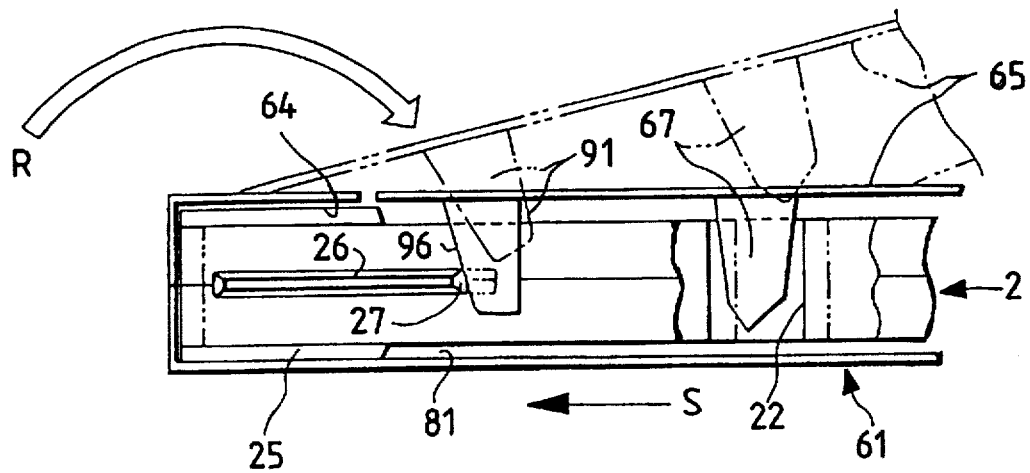
FIG. 4 is a cross-sectional view of an essential portion illustrating the pushing operation when the tape cassette is accommodated in the forward orientation.

Namely, if the cover section 61 and the casing section 62 are closed together by being rotated as indicated by arrow R in FIG. 4, the inclined surface 96 of the positioning projection 91 abuts against one end 27 of the side projection 26 of the tape cassette 2, and as closing is continued, the tape cassette 2 is pushed in the direction of arrow S in correspondence with the angle of the inclined surface 96. This pushing is naturally effected simultaneously on both sides of the tape cassette 2.

Consequently, if the tape cassette 2 was located at the position indicated by the phantom lines (on the right-hand side in the drawing) at the time of insertion, the tape cassette 2 is forcibly pushed to the position indicated by the solid lines in correspondence with the angle of inclination of the inclined surface 96. Accordingly, the hubs 22 also move from the position indicated by the phantom lines to the position indicated by the solid lines, so that the common area 4 is enlarged in correspondence with the amount of movement.

Next, referring to FIG. 5, a description will be given of the pushing operation when the tape cassette 2 is inserted in the backward orientation. It should be noted that, in FIG. 5, the illustration of the positioning projection 91 is omitted for the convenience' sake.

Figure 5:
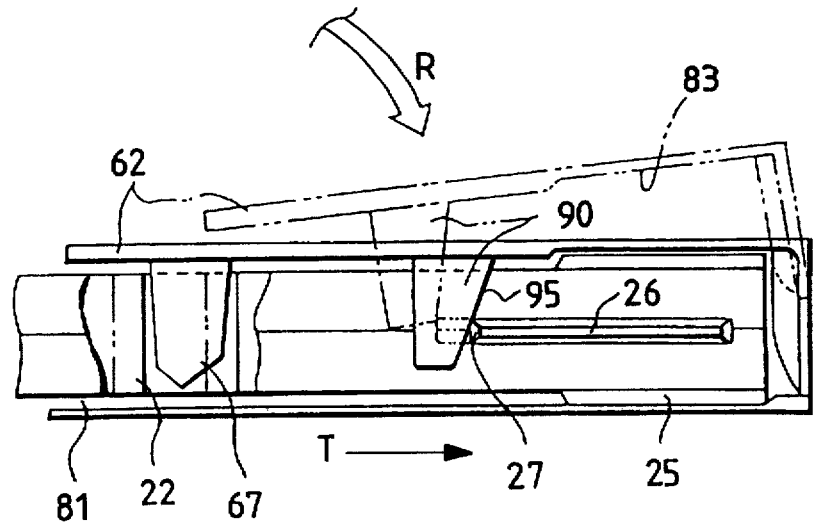
FIG. 5 is a cross-sectional view of the essential portion illustrating the pushing operation when the tape cassette is accommodated in the backward orientation.

Namely, if the cover section 61 and the casing section 62 are closed together by being rotated as indicated by arrow R in FIG. 5, the inclined surface 95 of the positioning projection 90 abuts against one end 27 of the side projection 26 of the tape cassette 2, and as closing is continued, the tape cassette 2 is pushed in the direction of arrow T in correspondence with the angle of the inclined surface 96. This pushing is naturally effected simultaneously on both sides of the tape cassette 2.

Consequently, if the tape cassette 2 was located at the position indicated by the phantom lines at the time of insertion, the tape cassette 2 is forcibly pushed to the position indicated by the solid lines in correspondence with the angle of inclination of the inclined surface 96. Thus, the hubs 22 also move from the position indicated by the phantom lines to the position indicated by the solid lines, so that the common area 4 is enlarged in correspondence with the amount of movement. At the same time, the enlarged-thickness portion 25 is fitted completely in the recess 83.

If the enlargement of the common area 4 in the above-described manner is described with reference to FIG. 24 which was used to describe the background art, since the interval W is enlarged, the diameter and size of the aforementioned rotation-preventing projection 67 can be made so as to, provide sufficient strength. Moreover, since the rotation-preventing projection 67 has a shape which makes it possible to retain the hub pawls 23 reliably, the magnetic tape is reliably prevented from slackening.

It should be noted that the positioning projections 90 and 91 exhibit noteworthy action in addition to the enlargement of the common area 4.

Namely, as described with reference to FIG. 4, in the case where the tape cassette 2 is accommodated in the accommodating case 60 in the forward orientation, and the cover section 61 and the casing section 62 are closed together, the tape cassette 2 is pushed by the positioning projections 91, and is continued to be pushed toward the pocket 64 side until it is opened again. Accordingly, the tape cassette 2 is positioned in a predetermined accommodating position, and even if the overall accommodating case 1 is shaken in the accommodated state, the tape cassette 2 does not reciprocate between the pocket 64 side and the opening side, thereby making it possible to substantially reduce the vibration of the tape cassette 2.

In addition, as described with reference to FIG. 5, in the case where the tape cassette 2 is accommodated in the accommodating case 60 in the backward orientation, and the cover section 61 and the casing section 62 are closed, the tape cassette 2 is pushed by the positioning projections 90, and is continued to be pushed in such a manner as to remain fitted in the recess 83 until it is opened again. Accordingly, the tape cassette 2 is positioned in a predetermined accommodating position, and even if the overall accommodating case 1 is shaken in the accommodated state, the tape cassette 2 does not reciprocate between the pocket 64 side and the opening side, thereby making it possible to substantially reduce the vibration of the tape cassette 2.

Thus, the provision of the positioning projections 90 and 91 makes it possible to enlarge the common areas 4 for insertion of the rotation-preventing projections 67, and to prevent the slackening of the magnetic tape by means of the rotation-preventing projections 67 arranged to be provided with sufficient strength in correspondence with the enlargement of the common area 4. Furthermore, it is possible to simultaneously effect the positioning and the prevention of movement with play of the tape cassette 2 accommodated in the accommodating case 60.

The amount of movement of the tape cassette 2 by means of the positioning projections 90 and 91 can be set freely by the angles of inclination of the inclined surfaces 95 and 96, and the width of the common area 4 corresponding to the amount of movement can also be set freely. Accordingly, even if the tape cassette 2 is accommodated in either the forward or the backward orientation, it is possible to align the position of the hubs 22 completely. In the case where the hubs 22 are completely aligned, the rotation-preventing projections 17, which have been described previously with respect to the background art, may be provided instead of the arrangement of the rotation-preventing projections 67. However, in a case where the tape cassette 2 is moved in such a manner as to allow the hubs 22 to be aligned completely, the shape of the accommodating case 60 becomes large. Therefore, the setting of the angles of inclination of the inclined surfaces 95 and 96, i.e., the setting of the pushing width of the tape cassette 2, can be made freely depending on the strength and shape of the rotation-preventing projections 67 and to what extent the overall size of the accommodating case 60 is to be set.

Although the embodiments of the present invention have been described above, the present invention is not limited to the same, and various modifications are possible.

For example, as for the positioning projections 90 and 91, either one of them may be provided. In addition, the positioning projections 90 and 91 may be formed integrally without being split, and the shape thereof in this case becomes trapezoidal as viewed from the side. Further, the shape of the rotation-preventing projection 67 is not limited to the above-described shape, either. In this embodiment, although the recess 81 is formed in an elongated shape, the recess 81 may be formed by being split into a position corresponding to the pocket 64 and a position corresponding to the recess 84.

As described above, the cassette accommodating case in accordance with the present invention is arranged such that a positioning projection having an inclined surface is provided on each of the side portions of the casing section, and when the casing section and the cover section are closed together to accommodate the tape cassette, the inclined surface is made to abut against an end of an elongated side projection formed on each of side surfaces of the tape cassette, so as to push the tape cassette in correspondence with the closing action of the casing section and the cover section. Accordingly, even if the tape cassette is accommodated in either the forward orientation or the backward orientation, the tape cassette is pushed in a desired orientation.

Therefore, it is possible to enlarge the common areas of the hubs into which the rotation-preventing projections are inserted, and the rotation-preventing projections can be formed into such a shape as to provide sufficient strength, thereby making it possible to reliably prevent the slackening of the magnetic tape and improve the reliability of the accommodating case.

In addition, since the tape cassette is positioned in place by the positioning projections, and the tape cassette remains in place with the casing section and the cover section closed, it is possible to prevent the mispositioning and movement with play of the tape cassette.

What is claimed is:

1. A cassette accommodating case including a cover section for accommodating a conventional tape cassette of the type having side projections formed on side surfaces of the cassette, the cover section comprising a cover-side opening wall arranged to extend along one surface of a magnetic tape cassette and a pocket capable of accommodating one end of the magnetic tape cassette, and a casing section having two opposing side walls and comprising a pair of rotation-preventing projections provided on a casing-side opposing wall facing the cover-side opening wall to retain a pair of hubs of the magnetic tape cassette by engaging the hubs, the casing section being pivotally attached to the cover section so that the case can be opened and closed, said cassette accommodating case comprising:

at least one positioning projection provided on each of the two opposing side walls of the casing section, said at least one positioning projection having an inclined surface in a plane substantially perpendicular to the two opposing side walls for pushing and urging the magnetic tape cassette in a direction parallel to the two opposing side walls by abutting against a front end or a rear end of the side projection formed on the side surface of the magnetic tape cassette.

2. A cassette accommodating case as recited in claim 1, wherein a single positioning projection is provided on each of the two opposing side walls, and said single positioning projection has two inclined surfaces.

3. A cassette accommodating case as recited in claim 2, wherein a distance between said two inclined surfaces increases in a direction from a top of the two opposing side walls to a bottom of the two opposing side walls.

4. A cassette accommodating case as recited in claim 1, wherein two positioning projections are provided on each of the two opposing side walls, and said positioning projections each include an inclined surface.

5. A cassette accommodating case as recited in claim 4, wherein a distance between the inclined surface on one positioning projection and the inclined surface on another positioning projection on the same side wall increases in a direction from a top of the side wall to a bottom of the side wall.

6. A cassette accommodating case as recited in claim 2, wherein the inclined surfaces are arranged to push and urge the magnetic tape cassette in one direction when the cassette is inserted in the case in a forward orientation, and in an opposite direction when the cassette is inserted in the case in a backward orientation.

7. A cassette accommodating case as recited in claim 4, wherein the inclined surfaces are arranged to push and urge the magnetic tape cassette in one direction when the cassette is inserted in the case in a forward orientation, and in an opposite direction when the cassette is inserted in the case in a backward orientation.

* * * * *